Dec. 30, 1947. E. F. SWARTZ 2,433,581
SPECIAL EMERGENCY BRAKE
Filed March 25, 1946 2 Sheets-Sheet 1
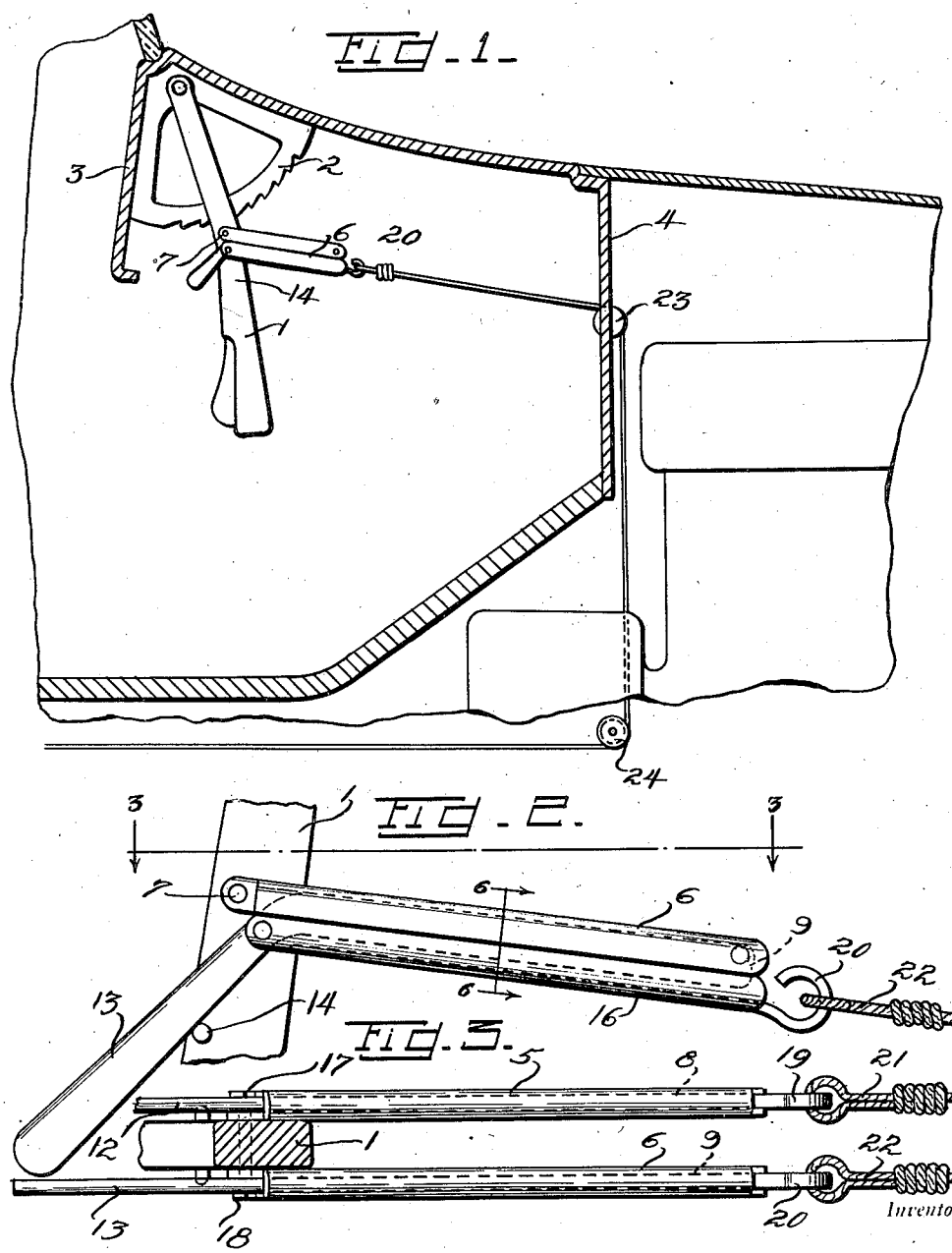
Inventor
Ernest F. Swartz Dec. 30, 1947.  E. F. SWARTZ  2,433,581
SPECIAL EMERGENCY BRAKE
Filed March 25, 1946  2 Sheets-Sheet 2
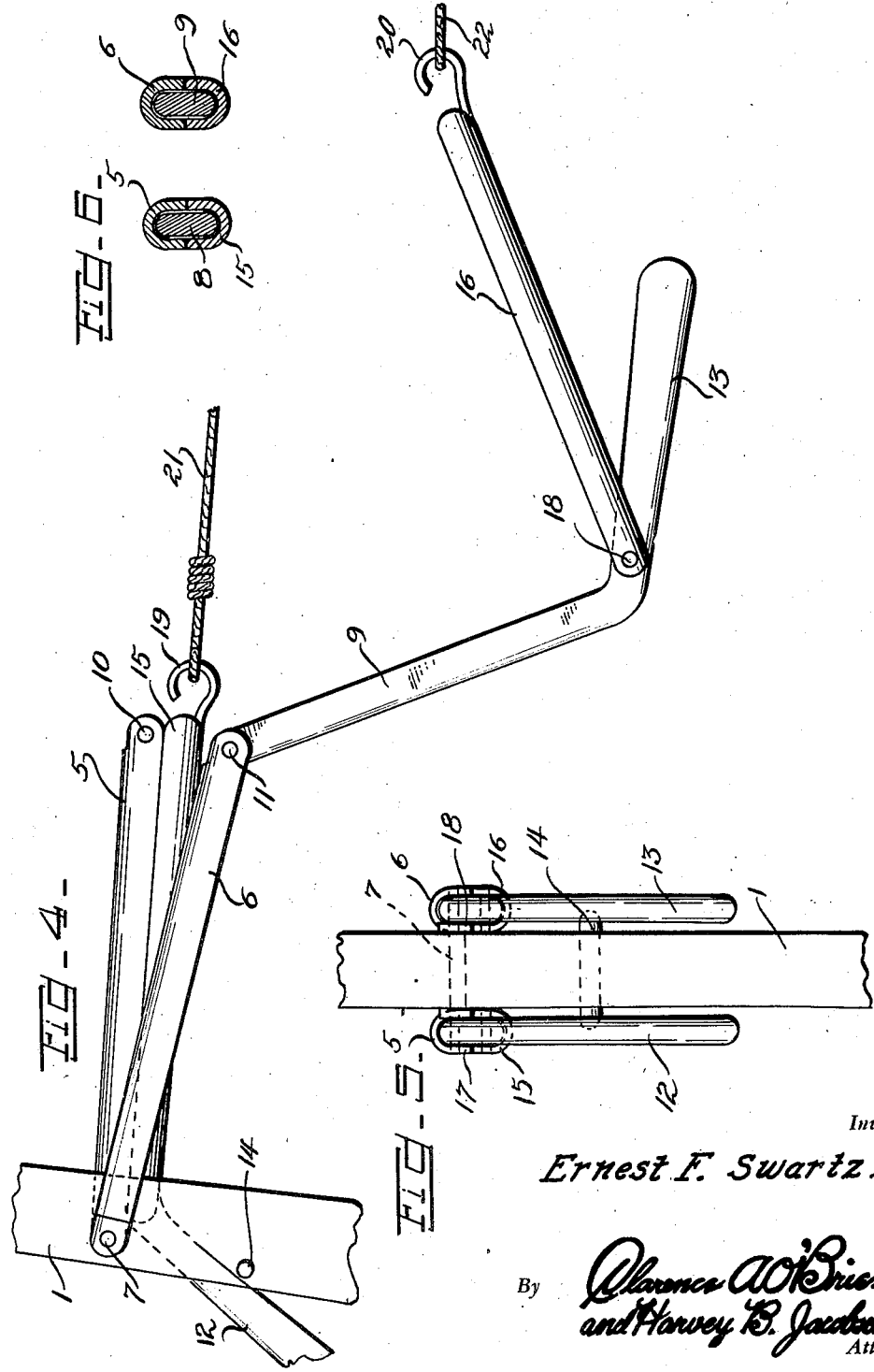
Inventor
Ernest F. Swartz Patented Dec. 30, 1947

2,433,581

UNITED STATES PATENT OFFICE 2,433,581

SPECIAL EMERGENCY BRAKE

Ernest F. Swartz, Berwyn, Pa.

Application March 25, 1946, Serial No. 657,043

6 Claims. (Cl. 188—16)

1

This invention relates to improvements in special emergency brakes for vehicles, and more particularly to a brake which will be so constructed that braking action will be applied to one rear wheel while no braking action is applied to the other rear wheel to facilitate the vehicle in pulling itself out of a slippery or skiddy spot.

An object of the invention is to provide an improved auxiliary emergency brake mechanism for vehicles which will be brought into play when a vehicle skids or slides off the edge of a road and the rear wheels will not gain traction.

Another object of the invention is to provide an improved special emergency brake device for vehicles which will apply a slight braking action to either one of the rear wheels of the vehicle for stopping that wheel from spinning when the vehicle is trying to extricate itself from a slippery spot or hole.

A still further object of the invention is to provide an improved means for selectively releasing the standard emergency brake cable on either rear wheel after which the application of the emergency brake will cause the other wheel to stop spinning and to gain traction so that the vehicle will be enabled to extricate itself from a position which would normally be impossible to get out of without the help of outside assistance.

A still further object of the invention is to provide an improved special or auxiliary emergency brake mechanism for vehicles which will be highly efficient in operation, and which will be relatively inexpensive to manufacture and produce.

Other objects will appear as the description proceeds.

In the accompanying drawings, which form a part of this application,

Figure 1 is a side elevational view showing the improved special emergency brake operating mechanism installed in a vehicle;

Figure 2 is an enlarged side elevational view of the tripping mechanism for releasing the regular emergency brake cables;

Figure 3 is a plan view taken on the line 3—3 of Figure 2;

Figure 4 is a side elevation of the special emergency brake operating mechanism showing one mechanism having been released to release one emergency brake cable while the other emergency brake cable is held taut;

Figure 5 is an end view looking toward the special emergency brake operating levers and the adjoining emergency brake lever, and Figure 6 is a sectional view taken on the line 6—6 of Figure 2.

Like characters of reference are used throughout the following specification and the accompanying drawings to designate corresponding parts.

2

In carrying out the invention, there is provided the usual emergency brake lever 1 having a cooperating toothed segment 2 located under the dash 3 of a vehicle or automobile 4.

A pair of inverted U-shaped members or links 5 and 6 are pivoted on the opposite sides of the regular emergency brake lever 1 on the cross pin or rod 7 extending through the said brake lever, and support the bell crank operating levers 8 and 9 on the pins 10 and 11, said levers 8 and 9 being formed with handle portions 12 and 13 at their outer ends, which are secured behind the ends of the cross locking pin 14 extending through the regular emergency brake operating lever 1 below the cross pin or rod 7.

A pair of U-shaped members or links 15 and 16 are pivoted on the pins 17 and 18 to the bell crank operating levers 8 and 9, and underlie the said operating levers when the several members and parts are in set position, while the inverted U-shaped members or links 5 and 6 overlie said levers 8 and 9, as clearly shown in Figure 2 of the drawings.

Hooks 19 and 20 are formed on the outer ends of the members or links 15 and 16 and are connected to the cables 21 and 22 which extend over the pulleys 23 and 24 to connect with the regular emergency brake operating means for the rear wheels of the vehicle 4, one cable connecting with each of said rear wheels.

In normal operation for driving, the handles 12 and 13 are arranged as shown in Figures 1 and 2 and are adapted to be moved outwardly to clear the pins 14 when they are tripped. If the vehicle slips off the edge of the road or gets bemired or loses traction on a slippery place where one wheel continuously spins, the driver will knock down or trip the handle connecting with the wheel which is not spinning thereby releasing the tension on that cable, then by applying the emergency brake lever 1, the brake will be applied slightly to the wheel which was spinning to partially brake the same, then both wheels will gain traction and the vehicle will extricate itself from the mud or slippery place without the help of outside assistance.

From the foregoing description, it will be apparent that there has been provided a highly efficient form of auxiliary or special emergency brake actuating mechanism which will be brought into play to assist in the extricating of a vehicle that has become bemired or stuck in a muddy or slippery place.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a vehicle having an emergency brake lever, foldable cable releasing links on said brake lever, operating handles interposed between said links, and cables connecting said links with the rear brakes of said vehicle.

2. In combination with a vehicle having an emergency brake lever, foldable cable releasing links on said brake lever, operating handles connected with said links, and cables connecting said links with the rear brakes of said vehicle whereby one wheel may be partially braked while the other wheel remains free to gain traction.

3. In combination with a vehicle having an emergency brake lever, pivotally connected foldable links and bell crank levers supported thereon, cables connecting said links with the rear brakes of said vehicle whereby one of said rear brakes may be partially braked while the other rear wheel is permitted to gain traction to extricate the vehicle from a muddy or slippery position.

4. The subject matter as claimed in claim 3, and means for locking the cable releasing links in locked position.

5. The subject matter as claimed in claim 3, and said links being so shaped as to enclose portions of said bell crank levers when the same are in locked position.

6. The subject matter as claimed in claim 3, and brake cable engaging hooks formed on said links and connected with said cables whereby the tension on either brake cable will be relieved upon the unlocking of said foldable links and bell crank levers.

ERNEST F. SWARTZ.

REFERENCES CITED

The following references are of record in the file of this patent:

UNITED STATES PATENTS

| Number | Name | Date |
|---|---|---|
| 986,499 | Ray | Mar. 14, 1911 |
| 1,224,826 | Wiser | May 1, 1917 |
| 1,635,727 | Piche | July 12, 1927 |